United States Patent
Fairchild et al.

(10) Patent No.: US 12,167,083 B2
(45) Date of Patent: Dec. 10, 2024

(54) AUDIENCE RESPONSIVENESS ANALYTICS INDEX FOR TELEVISION ADVERTISING

(71) Applicant: tvScientific, Inc., Pasadena, CA (US)

(72) Inventors: Jason Fairchild, Rolling Hills Estates, CA (US); David Koye, Richmond, VA (US)

(73) Assignee: tvScientific, Inc., Pasadena, CA (US)

(*) Notice: Subject to any disclaimer, the term of this patent is extended or adjusted under 35 U.S.C. 154(b) by 0 days.

(21) Appl. No.: 18/460,125

(22) Filed: Sep. 1, 2023

(65) Prior Publication Data

US 2023/0412880 A1    Dec. 21, 2023

Related U.S. Application Data

(63) Continuation of application No. 17/710,414, filed on Mar. 31, 2022, now Pat. No. 11,750,884.

(60) Provisional application No. 63/169,110, filed on Mar. 31, 2021.

(51) Int. Cl.
*H04N 21/81*    (2011.01)
*H04N 21/442*    (2011.01)

(52) U.S. Cl.
CPC . *H04N 21/44222* (2013.01); *H04N 21/44218* (2013.01); *H04N 21/812* (2013.01)

(58) Field of Classification Search
CPC .................................................. H04N 21/812
See application file for complete search history.

(56) References Cited

U.S. PATENT DOCUMENTS

| | | | |
|---|---|---|---|
| 8,904,418 B1 | 12/2014 | Rowe | |
| 10,789,619 B1 * | 9/2020 | Kahrl | G06Q 30/0242 |
| 2001/0054026 A1 | 12/2001 | Choate | |
| 2004/0107137 A1 * | 6/2004 | Skinner | G06Q 30/0277 |
| | | | 705/14.46 |
| 2006/0169769 A1 | 8/2006 | Boyarsky | |
| 2008/0066107 A1 | 3/2008 | Moonka | |
| 2009/0170614 A1 | 7/2009 | Herrmann | |
| 2009/0259518 A1 | 10/2009 | Harvey | |
| 2012/0116868 A1 | 5/2012 | Chin | |
| 2012/0254149 A1 | 10/2012 | Ramsay | |

(Continued)

FOREIGN PATENT DOCUMENTS

| WO | 2012144825 A2 | 10/2012 |
|---|---|---|
| WO | 2017019646 A1 | 2/2017 |

OTHER PUBLICATIONS

International Search Report and Written Opinion for International Application No. PCT/US2022/022942, mailed Aug. 9, 2022, 15 pgs.

(Continued)

*Primary Examiner* — Michael H Hong
(74) *Attorney, Agent, or Firm* — Patent Law Works LLP (57) ABSTRACT

A system and methods are disclosed for creating and using an audience-responsiveness analytics index for television advertising, in particular, advertising for connected television viewing. The audience-responsiveness analytics index may be configured to provide data obtained or acquired by measuring audience responsiveness to video advertising placed in streaming content viewed over connected televisions. The audience-responsiveness analytics index may be a graph used to optimize advertising with households assigned scores for multiple categories of advertising.

20 Claims, 5 Drawing Sheets

(56) References Cited

U.S. PATENT DOCUMENTS

| | | |
|---|---|---|
| 2013/0014223 A1 | 1/2013 | Bhatia |
| 2013/0339111 A1 | 12/2013 | Ross |
| 2014/0052546 A1 | 2/2014 | Phan |
| 2014/0237498 A1 | 8/2014 | Ivins |
| 2014/0282655 A1 | 9/2014 | Roberts |
| 2014/0351041 A1 | 11/2014 | Brown et al. |
| 2015/0220999 A1 | 8/2015 | Thornton |
| 2015/0238865 A1 | 8/2015 | Jeong |
| 2015/0348119 A1 | 12/2015 | Ferber |
| 2016/0019587 A1 | 1/2016 | Hueter |
| 2016/0132936 A1 | 5/2016 | Hertel et al. |
| 2016/0162940 A1 | 6/2016 | Kang |
| 2016/0191962 A1 | 6/2016 | Buddha |
| 2017/0034593 A1 | 2/2017 | Ray |
| 2017/0161793 A1 | 6/2017 | Knapp |
| 2017/0169462 A1* | 6/2017 | Meredith ........... G06Q 30/0244 |
| 2017/0372356 A1 | 12/2017 | Frommann |
| 2018/0343495 A1 | 11/2018 | Loheide |
| 2019/0251603 A1 | 8/2019 | Aatinen et al. |
| 2019/0379924 A1 | 12/2019 | Massoudi |
| 2020/0279626 A1 | 9/2020 | Ansari |
| 2021/0144426 A1 | 5/2021 | Navarre |
| 2021/0185407 A1 | 6/2021 | Marshall |
| 2021/0258654 A1 | 8/2021 | Kurzynski |
| 2022/0092638 A1* | 3/2022 | Shankel ............. G06Q 30/0205 |

OTHER PUBLICATIONS

EPO Communication Extended European Search Report, Application No. 22782254.1 tvScientific, Inc., mail date Jun. 25, 2024, 10 pgs.

* cited by examiner

AUDIENCE RESPONSIVENESS ANALYTICS INDEX FOR TELEVISION ADVERTISING

CROSS REFERENCE TO RELATED APPLICATION

This application is a continuation of U.S. patent application Ser. No. 17/710,414, filed Mar. 31, 2022, pending, which claims priority under 35 USC § 119(e) to U.S. Provisional Application No. 63/169,110, entitled "Audience Responsiveness Analytics Index for Television Advertising" filed on Mar. 31, 2021, the entirety of which application is herein incorporated by reference.

BACKGROUND

1. Field of the Invention

The present invention relates to paid content or advertisement ("ad") placement (e.g., video) for connected television viewing over the internet. More particularly, the present invention relates to a system and method for creating and using an audience-responsiveness analytics index for paid content or advertising (e.g., video) for display in streaming content viewed in a connected television ("CTV") or over-the-top ("OTT") environment.

2. Description of the Related Art

With the popularity and use of the Internet for streaming content, connected television or "CTV" or over-the-top ("OTT") delivery mechanisms use has grown dramatically in recent years. A CTV is a device that can connect to a TV or a smart TV that facilitates the delivery of streaming video content over the internet. A smart TV is a television with a built-in internet connection and media platform. No additional equipment is required to stream videos. Instead, videos are most often streamed via apps that are downloaded. Other connected devices that connect directly to a traditional television (not a smart television) and the internet and enable apps that are downloaded for viewing videos include Xbox, PlayStation, Roku, Amazon Figure TV, Apple TV, Chromecast, and more. Gaming consoles act as the connected device that provide access to apps from their app stores. These are referred to as "OTT" (Over-the-Top) devices. With this growth there has been an equally dramatic growth and migration to CTV advertising. For consumers, "CTV" is a different way to watch TV across multiple types of screens with no cable or satellite subscription required. For advertisers, it's an innovative way to reach a new and unique audience. Today's viewers are increasingly turning to diverse viewing options that don't necessarily involve a traditional television. They are watching smart TVs, laptops, smartphones, game consoles (Nintendo switch, Xbox, PlayStation) and other connected devices such as Amazon Fire, Roku, and Apple TV. However, programmatic advertising presents a complex eco-system involving a complicated interplay between several entities, including content providers, advertisers (both informed and uninformed), and users or viewers who browse the internet to view all types of streamed content available via websites that are of interest to them.

With connected TV advertising, advertisers can typically reach television viewers that advertisers cannot reach without traditional TV commercials. Superior targeting capabilities involve connected television audience targeting, by which companies can be sure that marketing dollars are going towards the most valuable and targeted viewers. In this industry, programmatic platforms allow measurement of the results of connected TV campaigns with both digital and traditional metrics, including video completion rates. Growing audience targets millennials and the growing population who do not use cable TV, also known as "cord cutters."

Connected TV advertising is becoming a powerful open platform that caters directly to a variety of new applications and services to homes, mainly for the young, middle-aged, and older adult population. Such a robust, tech-savvy audience represents incredible marketing opportunities with brands continuously seeking metrics to target specific advertising to viewers. Similar to other video advertisements, Connected TV advertisements may be pre-roll or mid-roll. Pre-roll ads are those shown before content and mid-roll ads are those shown in the middle of content. Considering most ads on Smart TVs are un-skippable and users are highly engaged (having carefully selected content they are most interested in viewing), CTV advertisements are extremely effective. Moreover, CTV ads are far more measurable than traditional TV advertising. With access to data, advertisers can quickly adjust their strategy based on what has or hasn't been working for their campaigns.

There is a need in the industry for continuous improvements to providing analytics data to create better advertising experiences for viewers.

SUMMARY

The present technology provides digital advertising functionalities for television in a buying and attribution platform that facilitates self-serve solutions that combine fully optimized media buying with comprehensive measurement and attribution. The present invention introduces a demand-side platform that provides performance-based advertising by creating an analytics index for gauging audience responsiveness to connected television (CTV) advertising.

The demand-side platform is a dynamic platform that creates an analytics index. It comprises one or more computing architectures with processors that are distributed across networks to create a programmatic advertising environment. The analytics index for measuring audience responsiveness comprises a plurality of engines that are configured to perform functionalities to create the index. The analytics index is created by using the following criteria. In some implementations, a household ("HH") CTV/OTT responsiveness index is created by configuring engines to collect data on households that are identified as "Exposed and Converting," which data is written to an operating platform's household-responsiveness graph. It should be recognized that "Exposed" refers to a household that has access to connected television and capability to view CTV or OTT advertising. In accordance with some aspects of the invention, as the "Exposed" household continues to be exposed to future or more CTV/OTT ads, increments are added to the "exposed vs outcome" index with each instance of viewing or display.

In some embodiments, values are determined according to the number, length of time from advertisement exposure to action, and category of conversions completed and assigned to the households or homes.

In some embodiments, the household ("HH") advertising responsiveness index measures households exposed to advertising or ads, by advertising category (CPG, Auto, Travel, commerce, etc.). The advertising responsiveness measure households that have a) seen the CTV/OTT ad and responded to the CTV/OTT ad, usually via a "second screen response" mechanism (seeing a CTV/OTT ad and responding by using their cell phone to go to the advertiser website or other example provided below). In some embodiments, the index also measures the impact of frequency on conversions. For example, the response rate after seeing one ID is "X," responsiveness after seeking two ads is "Y," etc. Another measurement is time from CTV/OTT to action. For example, how much time did it take for a house (or group of houses) to respond to an ad after seeing the ad. In some instances, measurements are taken by advertisement vertical, and by profile of the household (demo, etc.).

In some embodiments, the index measures advertising responsiveness by household frequency, including cross channel (e.g., CTV ad delivery+display+OTT+++). An index created at the household ("HH") level that dictates the optimal frequency and combination of ad formats in support of CTV/OTT ad delivery to drive ad responsiveness.

In some embodiments, the index measures second-screen audience response to television advertising. The second screen response encompasses instances when users/viewers/audience are exposed to a CTV/OTT advertising and then undertake one of the following actions. It should be recognized that the actions described here are provided as examples, but may not limited to these specific examples. For example, pick up a cell phone and go directly or indirectly to the advertiser's site, pick up a laptop computer and go directly to the CTV advertiser's site, pick up a tablet and navigate directly or indirectly to the CTV advertiser's site, go to the desktop computer and navigate directly or indirectly to the CTV advertiser's site, pick up a cell phone and engage with a Quick Response ("QR") code in the CTV ad, taking them to the advertiser's offer page; and pick up the cell phone and dial a phone number to engage with the CTV advertiser.

The system and methods disclosed below may be advantageous in a number of respects. They provide a CTV advertising audience responsiveness index for use in CTV advertising.

BRIEF DESCRIPTION OF THE DRAWINGS

The present invention is illustrated by way of example, and not by way of limitation in the figures of the accompanying drawings in which like reference numerals are used to refer to the same or similar elements.

DETAILED DESCRIPTION

The systems and methods of this technology are configured to be implemented in a demand-side platform ("DSP") for advertising for connected television ("CTV") or over-the-top ("OTT") delivery mechanisms. A typical demand-side platform integrates with multiple sources such as data management platforms ("DMPs"), ad exchanges, supply sources etc., in an infrastructure that provides secure, elastic, compute capacity in the "cloud" that comprises computers from Virtual Machines and Bare Metal servers to high performance computing ("HPC"), graphics processing units ("GPU"), container orchestration and management etc. A demand-side platform is typically integrated in three phases, the first, involving research and set up. The second phase is the development stage and the final phase is testing the integration. Demand-side platforms typically support cross-channel platforms and integrate with all the main ad exchanges. The bidding process is one of the key features of a demand-side platform. This is performed by a component called "bidder" which is responsible for placing bids on inventory during real-time bidding auctions. Usually, multiple bidders will be there to manage all real-time demands simultaneously. An Ad Server is an essential tool for creative management and for storing an ad creative and displaying to a user/viewer when required. Some DSPs have their own ad servers while others may connect to external ad servers depending on the architecture. A Campaign tracker helps to record the data regarding the performance of a particular campaign. The data includes clicks, impressions and spends. Once the data is recorded, it will be transferred to the reporting dashboard. The campaign tracker helps the user/viewer to determine the performance of a particular campaign. A reporting database stores all the data received from the campaign tracker. Users/viewers can generate reports by making use of this information. User/viewer data is an important part of the DSP, which helps in processing and storing important information about the user/viewer/audience. User/viewer data may include information regarding buying habits, interests, age groups, demographic details etc. Marketers can make use of this information to improve the effectiveness of their campaigns and bring in better results. A user interface is the dashboard where the marketers work on creating, managing and optimizing their campaigns. Ads in DSPs are sold in a few ways, depending on the DSP. DSPs specifically built for performance campaigns such as app-installs, charge a fee based on CPI (Cost per Install) or CPV (Cost per View) for video advertising campaigns. Prices of ad impressions in DSPs are determined by a real-time bidding (RTB) process, that takes place within milliseconds, as a user loads content or interacts with an app.

DSPs are unique as they offer the same capabilities as what ad networks used to provide, with an addition to a suite of audience targeting options. The advantage of DSPs over ad networks is that they provide advertisers with the ability to do real-time bidding on ads, serve ads to a multitude of platforms, track and optimize—all under a single interface. Some targeting options offered by a DSP include—demographic targeting (Targets based on demographic features such as age (or age group), job title, gender, education etc.), device targeting (shows viewers ads on specific devices to improve the personalization), re-targeting (targeting existing customers) and so on. DSPs are also used for retargeting campaigns. This is possible because they are able to manage large volumes of ad inventories and recognize ad requests with an ideal target audience, targeted by the advertiser. The DSP in accordance with the present invention offers a self-serve platform, which is an excellent way to manage ad campaigns. This offers targeting, bidding, budgeting and optimizing of ad campaigns. A DSP can integrate with a data management platform (DMP) that stores audience data, usually coming from multiple sources. It allows advertisers to create target audiences for their campaign based on 1st party and 3rd party audience data. A DMP acts as a single platform that consolidates online and offline data from various advertisers, creating demographics, behavioral and affinity segments which are then used as targeting options in digital advertising. Performance data from live campaigns are then fed back into the DMP, improving the accuracy of the data. DMPs allow advertisers to reach their specific target markets while reducing wastage in advertising. A DSP provides global reach and effective targeting. Through the present DSP, advertisers can connect to different segments of audiences by applying various targeting criteria.

Some portions of the detailed descriptions that follow are presented in terms of algorithms and symbolic representations of operations on data bits within a computer memory. These algorithmic descriptions and representations are the means used by those knowledgeable in the data processing arts to most effectively convey the substance of their work to others in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present technology also relates to an apparatus for performing the operations described. Parts of this apparatus may be specially constructed for the required purposes, or it may comprise general-purpose computing elements that are selectively activated or reconfigured by a computer program stored in the computer to operate the functionalities described in this application. Such a computer program may be stored in a computer readable storage medium, such as, but not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Portions of the present technology may take the form of an entirely hardware embodiment, an entirely software embodiment or an implementation containing both hardware and software elements. In some implementations, this technology is implemented in software, which includes but is not limited to, firmware, resident software, microcode, etc.

Furthermore, this technology may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented here are not inherently related to any particular computer or other apparatus. Various general-purpose systems may be used in combination with programs in accordance with the teachings herein, or it may prove convenient to construct more specialized apparatuses to perform certain required method steps. The required structure for a variety of these systems will appear from the description below. In addition, the present invention is not described with reference to any particular programming language. It will be appreciated that a variety of programming languages, for example, high level programming languages such as "C," "Java," or "Pascal," or other may be used to implement the teachings of the technology as described herein. The computers may be specially programmed, and be configured with special purpose hardware. Each computer may have a single processor, a multiprocessor or may comprise multiple computers, each of which may include a single processor or a multiprocessor, operably connected over a computer network. Each computer may be controlled by one of a variety of operating systems including Microsoft Windows, Macintosh, Linux, Unix, or a Java-based operating system, to name a few.

Each computer in the system may include one or more input and output (I/O) unit, a memory system, and one or more processing units. The input-output ("I/O") units of each computer may be connected to various input/output devices, such as a mouse, keyboard, video card (video monitor), sound card (with speakers), network card and printer. The memory system in a typical general purpose computer system usually includes a computer readable and writeable nonvolatile recording medium, of which a magnetic disk, a flash memory and tape are examples. The memory system operably holds the operating system, utilities, and application programs. It should also be understood the invention is not limited to the particular input devices, output devices, or memory systems used in combination with the computer system or to those described herein. Nor should the invention be limited to any particular computer platform, processor, or high-level programming language.

System Architecture Overview

Figure 1A:
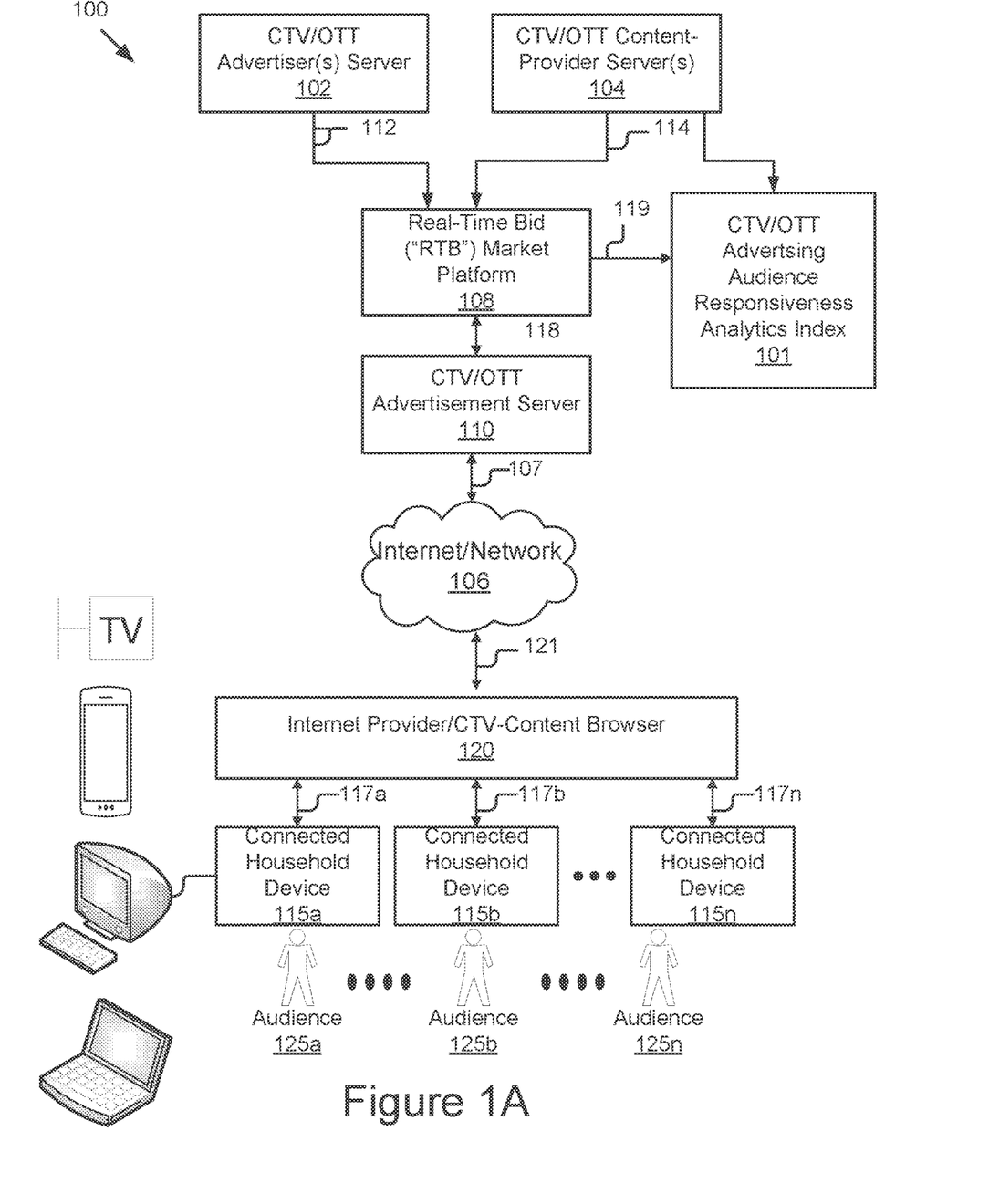
FIG. 1A is high-level block diagram, illustrating an example system and example CTV/OTT advertising environment in which the CTV/OTT advertising audience responsiveness analytics index created in accordance with the present invention operates according to some implementations of the present technology.

FIG. 1 illustrates a block diagram of a CTV/OTT audience responsiveness analytics index system in a demand-side platform 101 illustrated in a CTV digital advertisement ("ad") placement environment 100 in which the disclosed implementation of the CTV audience responsiveness analytics index system is operable. The environment 101 includes: an online advertiser server or website 102 (representing one or more online advertisers), an online content server or website 104 (representing one or more online content providers), a network 106, and a real-time bidding ("RTB") market platform 108. The online advertiser server 102 may be a computing system (of one or more computers or processors, either linked or distributed) that submits bids to the RTB market platform 108 to purchase content-provider inventory and have advertiser advertisements shown in the CTV environment. The advertiser server 102 is illustrated as coupled to the RTB market platform via signal line 112 and the content server is illustrated as coupled to the RTB market platform via line 114. The content server 104 may be a computing system that maintains content for televising that attracts viewers and contains placeholders for ads (from the ad inventory) that are submitted to the RTB market, for sale to advertisers. The content server 104 has access to data provided by the CTV audience responsiveness analytics index, either directly (not expressly illustrated in FIG. 1) or otherwise. The RTB 108 may be a computing system that provides a real-time bidding market that allows advertisers to bid on provider inventory in real-time. While only a single advertiser server 102, a single content server 104 and a single network 106 are shown in FIG. 1, it should be recognized that there may be thousands or even millions of advertiser servers 102, content servers 104, or networks 106 that integrate in a programmatic advertising environment. FIG. 1 is merely provided as one example illustration of the systems 102, 104, and 106, which present the environment in which the present technology may be implemented.

The advertiser server 102 is coupled by signal line 112 for communication with the real-time bidding market 108. Although not explicitly shown in FIG. 1, it should be recognized that any and all the signal lines illustrated in FIG. 1 may route, via the network 106, as illustrated in FIG. 1. The advertiser 102 is coupled to the real-time bidding market 108 to send bids on impressions, and also provides advertisement content, advertising target information, price, or any other information related to the impression or necessary to serve the ad on streaming content. The RTB market platform 108 is a real-time bidding market, which allows advertisers to bid on inventory in real-time.

The content site 104 is a computing device for providing any type of video content for viewing as streamed content on a household or related device. The signal line 114 provides information to the RTB about which impressions on the content site are available for the RTB market. A control line 109 from 104 to 106 indicates content provision from the online content servers.

The network 106 is a conventional type, wired or wireless, and may have any number of configurations such as a star configuration, token ring configuration or other configurations known to those skilled in the art. Furthermore, the network 106 may comprise a local area network (LAN), a wide area network (WAN) (e.g., the Internet), and/or any other interconnected data path across which multiple devices may communicate. In yet another embodiment, the network 106 may be a peer-to-peer network. The network 106 may also be coupled to or includes portions of a telecommunications network for sending data in a variety of different communication protocols. In yet another embodiment, the network 106 includes Bluetooth communication networks or a cellular communications network for sending and receiving data such as via short messaging service (SMS), multimedia messaging service (MMS), hypertext transfer protocol (HTTP), direct data connection, WAP, email, etc.

The RTB market platform 108 is coupled by signal line 118 to an advertisement server 110, which serves ads, for example video ads. The ad server 110 is software that receives requests for ad units, submits, and then fulfills those requests with content. The advertisement server 110 is coupled to the network 106 for communication and interaction with online advertisers 102 and the content site 104. A viewer (audience) 125 who is viewing streamed content is a potential consumer of ads. There may be any number of viewers (audience) 125a, 125b, through 125n, who are coupled via the network 106 to online sites 104 from which content may be streamed. For example, when a viewer in the audience (125a-125n) downloads content for viewing that is supplied by an online content site 104, requests are sent to the content site 104 (the content provider's server) for content. The viewer (125a-125n) navigates to content for streaming via a web browser 120. The browser may be any one of Chrome, Safari, Firefox, Internet explorer or the like.

The content site (provider) serves up the content, which includes executable javascript tags. Once these tags are loaded in the viewer's content browser 120 (via lines 117a, 117b, through 117n), they are executed (via lines 121 and 107) and notify the ad server 110 that there is an impression that needs filling in the streaming content. The impression is then submitted to the Real-Time Bidding (RTB) market platform 108, where advertisers bid to fill the impression with their video advertisements. The RTB market platform reads in the market floors for each of the competing advertisers and uses these market floors, along with the advertiser bids, to determine the winner of the auction and their clearing price. In the event that all of the received bids are too low, the Auction may not clear. The operation of the RTB market platform 108 will be described in more detail below with reference to FIG. 2.

Figure 1B:
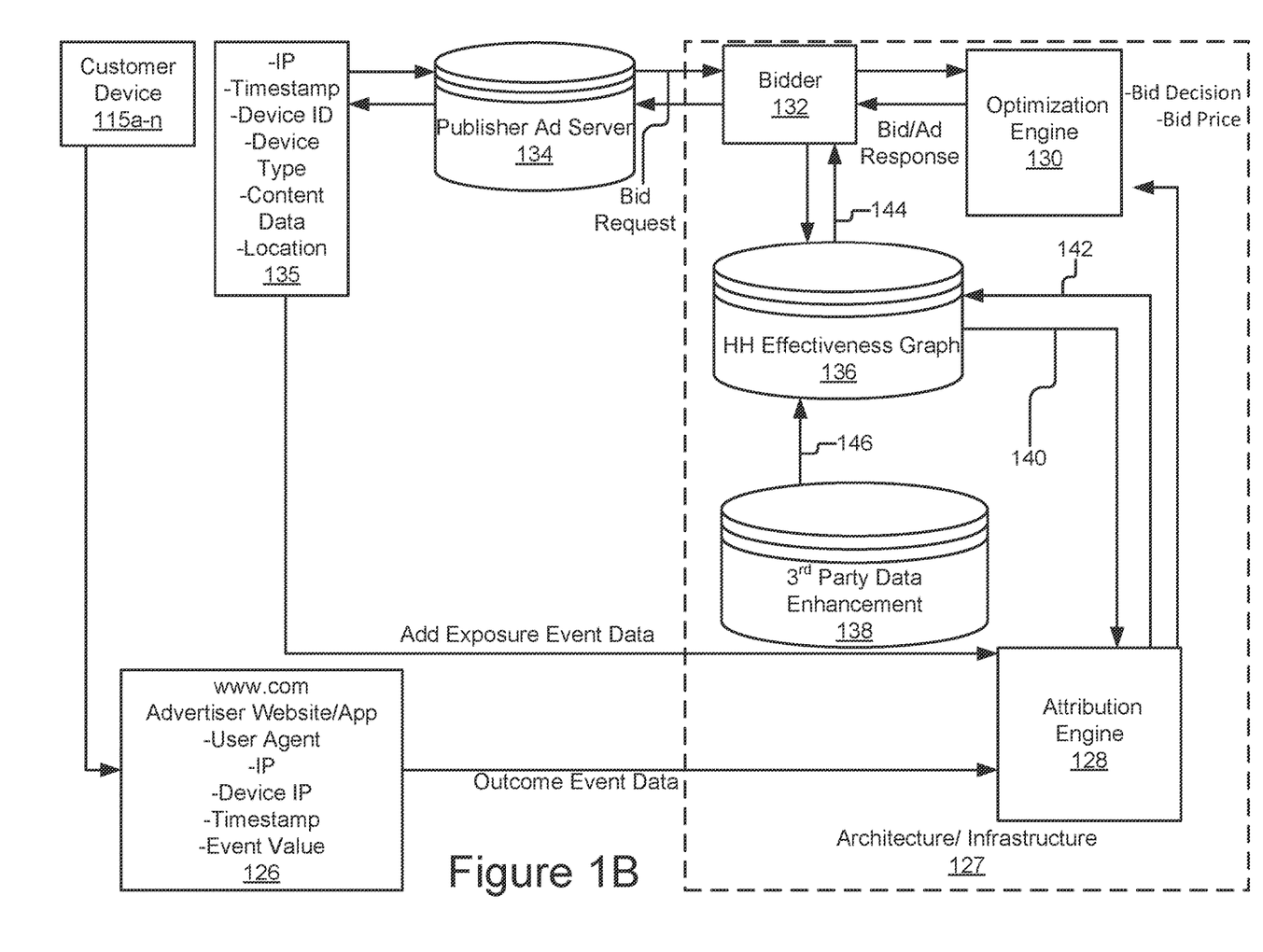
FIG. 1B is a high-level diagram of the architecture and event flow.

Referring now to FIG. 1B, referring also to FIG. 1B, which illustrates the architecture and flow of event data, the customer device 115a-n may access an advertiser website/app (e.g., www.com) designated by reference numeral 126, at which point, the event and related data is generated and recorded as "outcome event data." The outcome event data in some embodiments of the present invention may include the "User Agent," the "IP address," the "Device IP," a "Timestamp," or an "Event Value." The infrastructure or architecture of the platform 127 includes an attribution engine 128, to which the outcome event data is continuously provided. In some instances, the outcome event data may be provided at designated intervals determined by the platform. The attribution engine 128 is coupled to an optimization engine 130, which provides a bid decision and bid price to the bidder 132. As illustrated, the bidder provides a bid or ad response to the publisher ad server 134 when a bid request is received by the bidder 132. Ad Exposure Event data is continuously tracked and recorded as each bid request is generated. For example, event data that may be recorded includes the "IP," a "Timestamp," a "Device ID," a "Device Type," "Content Data," "Location," or the like compiled at a storage location designated by reference numeral 135. A household ("HH") effectiveness graph 136 is coupled to the bidder 132 and serves to provide additional data from a 3rd Party Data Enhancement server 138 as designated by signal line 146. Examples of the additional data may include, but not limited to, postal data, latitude/longitude data, IP type, age, gender, and household income. In addition, new IDs are linked to known households and provided to the attribution engine 128, as designated by signal line 140. And, the attribution engine 128 adds new results to known or new households, as designated by signal line 142. The household effectiveness graph 136 enhances bid requests with additional data as designated by signal line 144. The outcome event data may be used by scoring engines to accord responsiveness scores to advertising, which may be stored in the index.

Figure 2:
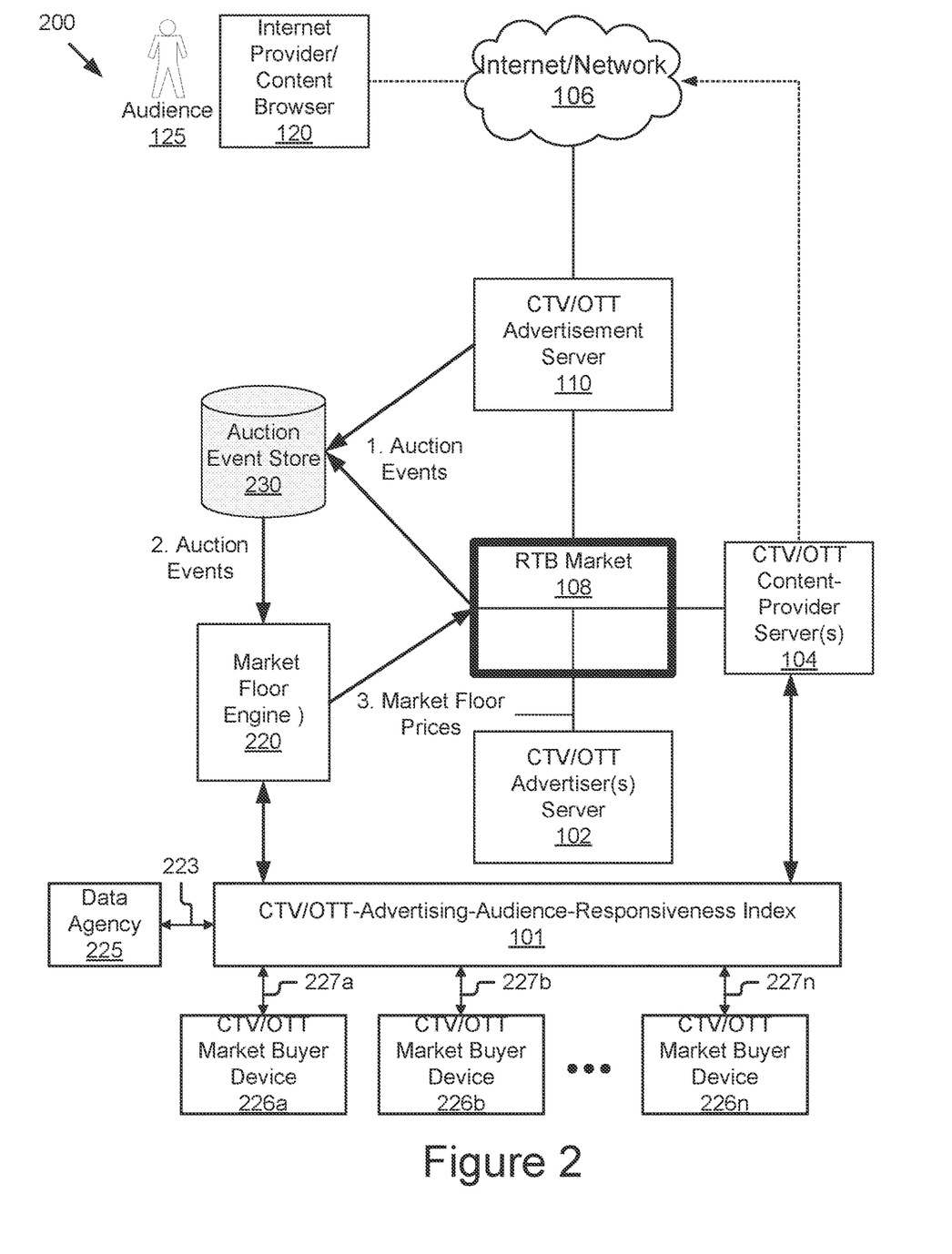
FIG. 2 is a high-level block diagram, illustrating an example CTV/OTT advertising audience responsiveness analytics index configured to operate with a market floor engine and auction event store operating a floor auction for CTV/OTT ad placement.

Referring now to FIG. 2, the RTB market platform 108 implements a real-time bidding market. In the implementations described here, the RTB market platform 108 conducts a market floor auction for ad placement (e.g., video), which is a specialized auction that determines an auction winner, auction clearing price based on the bids submitted by advertisers, and per-advertiser market floors that are calculated and distributed by the market floor system 100. In some implementations, an auction event store 230 may include a large collection of computers arranged in a distributed, computational, and storage grid. The auction event store 230 may store events from the Advertisement server 110 and RTB market platform 108. A market floor engine 220 determines and provides market floor prices, which may in some instances be dynamically or selectively set by providers. In some implementations, the market floor engine 230 may be an analytics engine that processes auction event data in either real-time, near-real-time, or batch mode, determines market floors based on this data, and assesses the revenue impact of using these market floors compared to provider "static" floors and/or other benchmarks. The provider may determine market floors by deriving data from the CTV audience responsiveness analytics index system 224. The index system 224 may be directly coupled to either market buyer devices 226a, 226, or 226n, via lines 227a, 227b, through 227n, or an agency 225, via line 223, to directly provide data and revenue value to any of these entities.

During an RBT auction, the advertisement server 110 and RTB market platform 108 generate a number of events that include information about the context in which the RBT auction is occurring. An "event profile" (with the type of information available in the auction bids that are received) may be generated when all of the bids from the advertisers in an RBT auction have been received. An auction event store 230 may store information available in the "auction complete" event generated when an auction has completed. The auction event store 230 may include a large collection of computers arranged in a distributed, computational, and storage grid. The auction event store 230 in some implementations stores events from the advertisement server 110 and the RTB market system 108.

Figure 3:
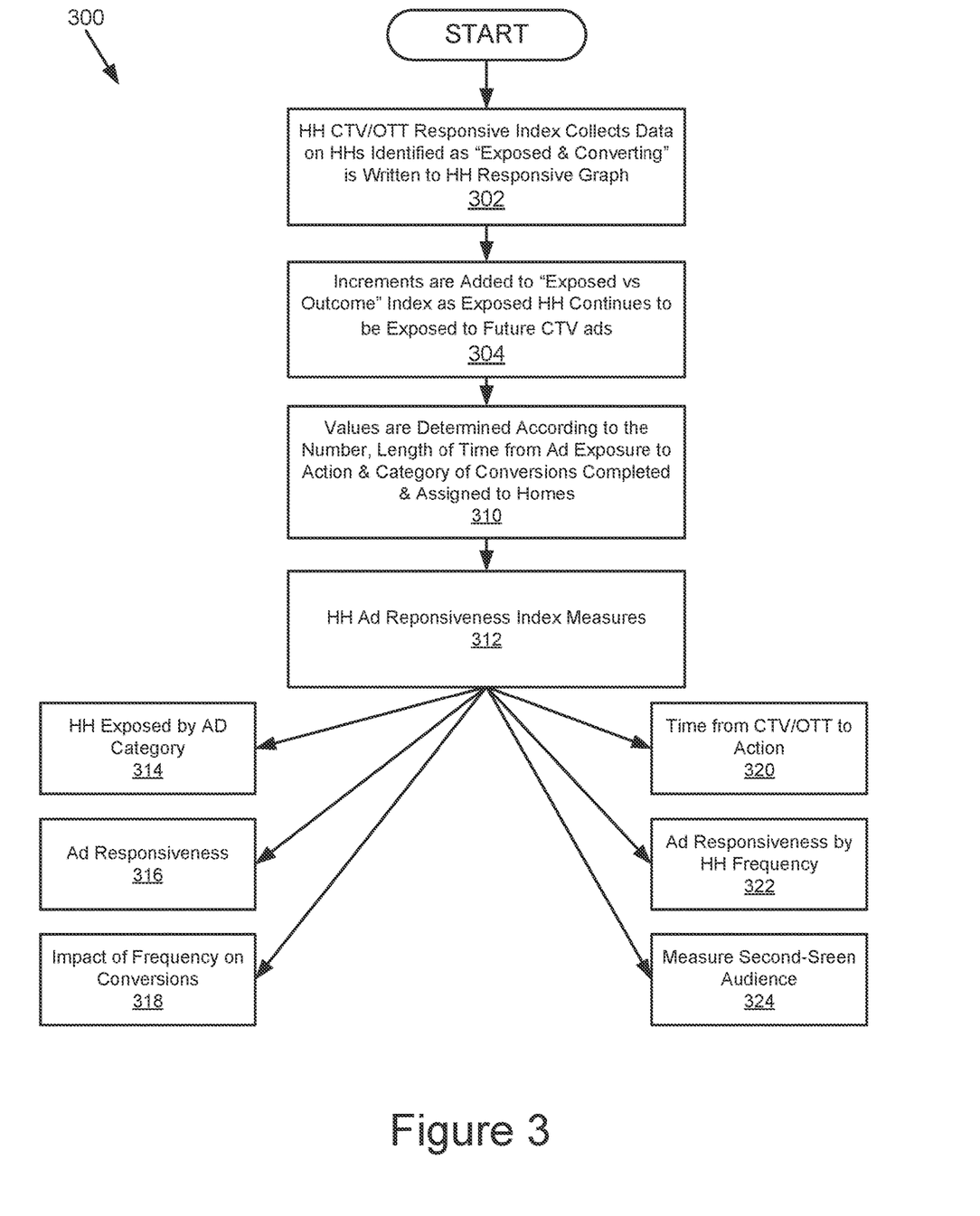
FIG. 3 is a block diagram, illustrating a flow chart of the approach to creating and using the CTV/OTT advertising audience responsiveness analytics index.

Referring now to FIG. 3, an example implementation of the CTV audience responsiveness analytics index system 100 is illustrated. This implementation of the analytics index 100 comprises data collection engines. These engines are operated by one or more processors that comprise an arithmetic logic unit, a microprocessor, a general-purpose controller or some other processor array to perform particular computations as programmed and provide electronic display signals to a display device. The processor is coupled to the bus for communication with the other components. The Processor processes data signals and may comprise various computing architectures including a complex instruction set computer (CISC) architecture, a reduced instruction set computer (RISC) architecture, or an architecture implementing a combination of instruction sets. Although only a single processor is referenced here, multiple processors may be included. It will be obvious to one skilled in the art that other processors, operating systems, sensors, displays and physical configurations are possible.

The processor is coupled to a memory that stores instructions and/or data that may be executed by the processor. The memory is coupled to the bus for communication with the other components. The instructions and/or data may comprise code for performing any and/or all of the techniques described herein. The memory may be a dynamic random access memory (DRAM) device, a static random access memory (SRAM) device, flash memory or some other memory device known in the art.

In one embodiment, storage stores data, information and instructions used by the ad request and delivery engines, data collector engines, optimization engines, and the direct request of source (from provider) by User/Agency etc. The storage is a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis. The data storage is coupled by the bus for communication with other components of the analytics index system for impression evaluation and allocation.

One or more of the engines are software or routines executable on the processor. In some implementations, one or more of the engines store data that, when executed by the processor, causes the collectors/modules to perform the operations described below. In yet other implementations, one or more of the engines are instructions executable by the processor to provide the functionality described in the flow charts that follow. In still other implementations, one or more of the delivery engines are stored in the memory and are accessible and executable by the processor.

The flow chart illustrated in FIG. 3 shows the analytics index is created by the following steps including one or more operations for creating and using a household ("HH") CTV Responsiveness Index, as described in block 302. This index is configured to collect data on households that are identified as "Exposed and Converting," which data is written or stored to the operating platform's household-responsiveness graph. It should be recognized that "Exposed" refers to a household that has access to connected television and capability to view CTV/OTT advertising. The flow to create the index flows to the next block 304 of operations, including one or more operation for adding increments of every instance of exposure to the "Exposed versus Outcome" index, as the "Exposed" household continues to be exposed to future or more CTV ads. The process flows to the next block 310, including one or more operations for determining values according to the number, length of time from ad exposure to action, and category of conversions completed and assigned to the homes. The process proceeds to the next block 312, including one or more operations for creating the household advertising responsiveness index to measure households exposed to ads, by ad category (CPG, Auto, Travel, commerce, etc.), as described by block 314. In some embodiments, as described by block 316, the advertising responsiveness may be measured by households that have either seen the CTV/OTT ad and have responded to the CTV/OTT ad, usually via a "second screen response" mechanism (seeing a CTV/OTT ad and responding by using their cell phone to go to the advertiser website. Other examples include measuring the impact of frequency on conversions as described by block 318. For example, the response rate after seeing one id is X; responsiveness after seeking 2 ads is Y, etc. Another example as illustrated by block 320 includes time from CTV/OTT to action. For example, how much time did it take for a house (or group of houses) to respond to an advertisement after seeing the advertisement. This may be measured by advertising vertical and by a profile of the household (by a demo, etc.). As yet another example described by block 322, advertisement responsiveness by household frequency, including cross channel (CTV ad delivery+display+OTT+++) is measured and recorded in the index at the household ("HH") level that dictates the optimal frequency and combination of advertising formats in support of CTV/OTT ad delivery to drive ad responsiveness.

As yet another example, described by block 324, the index provides a measure of second-screen audience response to television advertising. It should be recognized that the second screen response encompasses instances when users/viewers/audience are exposed to a CTV/OTT advertising and then undertake one of the following actions. These examples are provided for illustration purposes and are not exhaustive. The description should not be limited to these specific examples. A second screen response may cause a viewer to pick up a cell phone and go directly or indirectly to the advertiser's site. Yet another example may cause a viewer to pick up a laptop computer and go directly to the CTV/OTT advertiser's site. Yet another example causes a viewer to pick up a tablet and navigate directly or indirectly to the CTV/OTT advertiser's site. Yet another example causes viewers to go to their desktop computer and navigate directly or indirectly to the CTV advertiser's site. Yet another illustrative example causes viewers to pick up their cell phones and engage with a Quick Response ("QR") code in the CTV/OTT advertising, thereby taking them to the advertiser's offer page. Yet another example is for viewers to pick up their cell phone and dial a phone number to engage with the CTV/OTT advertiser.

In some embodiments, the application of an ad responsiveness graph serves to optimize advertising. The graph may comprise household identification rows (rows of "HH IDs" and columns with various values accorded, including but not limited to, impressions by advertising category, frequency, by device type, sequence of cross-channel impressions, initial response rates, secondary response rates, post-conversion data (e.g., viewing to purchase action), such as average purchase price, order value, lifetime value etc. The graph may also illustrate a time decay from exposure to outcome.

Figure 4:
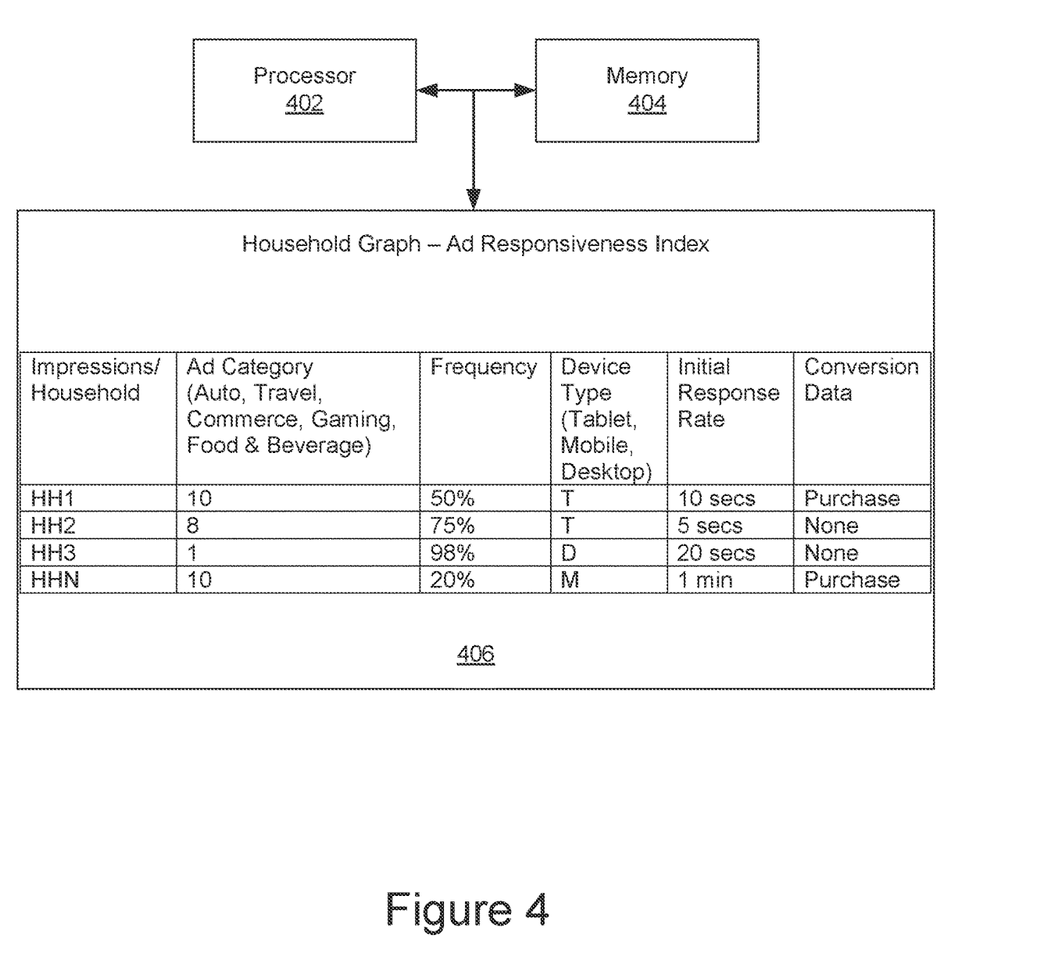
FIG. 4 illustrates an example index.

Referring now to FIG. 4, an example household graph or advertising responsiveness index is illustrated. The graph and index are created by a processor 402 coupled to a memory 404 with executable code execute all tasks to track and compile data and metrics for the index. This advertising responsiveness graph is used to optimize advertising delivery to CTV and OTT streaming content. The graph 406 is an example for purposes of illustration. Household identifiers or identification are recorded in rows and the columns record values for impressions. For example, impressions by be classified by advertising category, frequency, by device type, sequence of cross-channel impressions, initial response rates, secondary response rates, post-conversion data, such as average purchase price, order value, lifetime value. Time decay from exposure to outcome is another critical data point. Measures for the Index may include frequency, time to action from first and last exposure, frequency prior to action, sequence of device exposure, presence of other ad types in the journey, etc. Households may be assigned scores for multiple categories of advertising, for example, "10" for Gaming, "8" for Food and Beverage, and "1" for Automotive. Ad categories may include commerce, travel etc. The categories described here are only by way of example.

In some embodiments, measures for the index, include but are not limited to, frequency, time to action from first to last exposure, frequency prior to action, sequence of device exposure, presence of other types of advertising in the journey. Households may be accorded composite or lifetime scores, for example, some form of cumulative score accorded based on scores and metrics tracked for multiple categories of advertising, for example, a "10" for gaming, a "8" for Food and Beverage, and a "1" for automotive.

In some embodiments, the household ("HH") advertising responsiveness index measures households exposed to advertising, by advertising category (CPG, Auto, Travel, Commerce etc.). Advertising responsiveness or exposure measures households that have seen an advertisement in streaming content, on one or more of connected television (CTV/OTT), tablet, mobile phone, desktop, or laptop, responded to the CTV advertising usually via a second screen response mechanism. As recognized by those skilled in the art, second screen viewing refers to seeing a CTV/OTT add and responding by using a cell phone to the advertiser website.

Reference in the specification to "one implementation or embodiment" or "an implementation or embodiment" simply means that a particular feature, structure, or characteristic described in connection with the implementation or embodiment is included in at least one implementation or embodiment of the technology described. The appearances of the phrase "in one implementation or embodiment" in various places in the specification are not necessarily all referring to the same implementation or embodiment.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present inventive technology be limited not by this detailed description, but rather by the claims of this application. As will be understood by those familiar with the art, the present inventive technology may be embodied in other specific forms without departing from the spirit or essential characteristics thereof. Likewise, the particular naming and division of the modules, routines, features, attributes, methodologies and other aspects are not mandatory or significant, and the mechanisms that implement the present inventive technology or its features may have different names, divisions and/or formats. Furthermore, as will be apparent to one of ordinary skill in the relevant art, the modules, routines, features, attributes, methodologies and other aspects of the present inventive technology can be implemented as software, hardware, firmware or any combination of the three. Also, wherever a component, an example of which is a module, of the present inventive technology is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present inventive technology is intended to be illustrative.

What is claimed is:

1. A method for generating an advertising-responsiveness graph index that continuously measures exposure to advertising and optimizes delivery of advertising across a plurality of households, comprising:
   in a computing device, comprising a processor and a memory storing executable instructions, wherein the executable instructions cause the processor to execute control actions, comprising:
   tracking, by the processor, an advertisement in streaming content viewable from either a connected-household device or an over-the-top delivery mechanism in a particular household, wherein the streaming content is viewable via either an advertiser's website or an application, wherein the processor initiates recording visit data and an outcome event data relating to a viewer of the streaming content when the viewer accesses the advertiser's website or the application;
   collecting, by the processor, signals representative of exposure data relating to the advertisement, wherein the exposure data includes category data for the advertisement;
   creating, by the processor, a household graph index, with the exposure data providing an exposure metric, by using a household identifier for each of the plurality of households, wherein the household graph index tracks frequency of exposure to the advertisement across the plurality of households that view the advertisement, wherein the outcome event data is further usable for according a responsiveness score to the advertisement and storing the responsiveness score in the household graph index and wherein the exposure metric includes a category classifying the advertisement, wherein the advertisement is classified by frequency, device type, sequence of cross-channel impression, initial response rates, secondary response rates, post-conversion data, and time decay from exposure to outcome; and
   applying the household graph index to provide one or more additional advertisements to the particular household.

2. The method of claim 1, wherein the particular household designated as an exposed household continues to be exposed to the one or more additional advertisements, wherein increment data are added to a designation in the household graph index to indicate exposed versus outcome data input with each instance of viewing or display in the particular household.

3. The method of claim 1, wherein the household graph index tracks a type of device used to stream the content, wherein the type of device is at least one of a connected television, a tablet, a mobile phone, a desktop, and a laptop.

4. The method of claim 3, wherein the household graph index tracks the frequency of exposure to the advertisement in a particular household and responsiveness to the advertisement via a second screen response mechanism.

5. The method of claim 1, wherein the streaming content is viewable via either the advertiser's website and the application and the visit data of each visitor viewer is recorded in addition to data representative of viewer engagement with a quick response code in the advertisement that leads to a particular advertiser's offer.

6. The method of claim 1, wherein the household graph index measures an impact of frequency on conversions.

7. The method of claim 1, wherein the household graph index measures a time from exposure to the advertisement via the connected-household device or the over-the-top delivery mechanism in a particular household to an action following the exposure to the advertisement.

8. The method of claim 1, wherein an action requires a household member to engage with a quick response code in the advertisement displayed via the connected-household device, taking the household member to an advertiser's offer page.

9. The method of claim 1, wherein an action requires a household member to directly or indirectly navigate to an advertiser's website.

10. The method of claim 1, wherein the household graph index takes measurements by advertisement vertical, and by profile of the particular household.

11. A system for generating an advertising-responsiveness graph index that continuously measures exposure to advertising and optimizes delivery of advertising across a plurality of households, comprising:
    in a computing device, comprising a processor and a memory storing executable instructions, wherein the executable instructions cause the processor to execute control actions that:
    track an advertisement in streaming content viewable from either a connected-household device or an over-the-top delivery mechanism in a particular household, wherein the streaming content is viewable via either an advertiser's website or an application, wherein the processor initiates recording visit data and an outcome event data relating to a viewer of the streaming content when the viewer accesses the advertiser's website or the application;
    collect signals representative of exposure data relating to the advertisement, wherein the exposure data includes category data for the advertisement;
    create a household graph index, with the exposure data providing an exposure metric, by using a household identifier for each of the plurality of households, wherein the household graph index tracks a frequency of exposure to the advertisement across the plurality of households that view the advertisement, wherein the outcome event data is further usable for according a responsiveness score to the advertisement and storing the responsiveness score in the household graph index and wherein the exposure metric includes a category classifying the advertisement, wherein the advertisement is classified by frequency, device type, sequence of cross-channel impression, initial response rates, secondary response rates, post-conversion data, and time decay from exposure to outcome; and
    applying the household graph index to provide one or more additional advertisements to the particular household.

12. The system of claim 11, wherein the particular household designated as an exposed household continues to be exposed to the one or more additional advertisements, wherein increment data are added to a designation in the household graph index to indicate exposed versus outcome data input with each instance of viewing or display in the particular household.

13. The system of claim 11, wherein the household graph index tracks a type of device used to stream the content, wherein the type of device is at least one of a connected television, a tablet, a mobile phone, a desktop, and a laptop.

14. The system of claim 13, wherein the household graph index tracks the frequency of exposure to the advertisement in a particular household and responsiveness to the advertisement via a second screen response mechanism.

15. The system of claim 11, wherein the streaming content is viewable via either the advertiser's website and the application and the visit data of each visitor viewer is recorded in addition to data representative of viewer engagement with a quick response code in the advertisement that leads to a particular advertiser's offer.

16. The system of claim 11, wherein the household graph index measures an impact of frequency on conversions.

17. The system of claim 11, wherein the household graph index measures a time from exposure to the advertisement via the connected-household device or the over-the-top delivery mechanism in a particular household to an action following the exposure to the advertisement.

18. The system of claim 11, wherein the action requires a household member to engage with a quick response code in the advertisement displayed via the connected-household device, taking the household member to an advertiser's offer page.

19. The system of claim 11, wherein the action requires a household member to directly or indirectly navigate to an advertiser's website.

20. The system of claim 11, wherein the household graph index takes measurements by advertisement vertical, and by profile of the particular household.

* * * * *